S. B. ARNOLD.
VALVE.
APPLICATION FILED JULY 22, 1918.

1,304,929.

Patented May 27, 1919.

Inventor
Stanley B. Arnold
By G. L. Cragg
Atty

UNITED STATES PATENT OFFICE.

STANLEY B. ARNOLD, OF CHICAGO, ILLINOIS.

VALVE.

1,304,929.   Specification of Letters Patent.   Patented May 27, 1919.

Application filed July 22, 1918.  Serial No. 246,169.

*To all whom it may concern:*

Be it known that I, STANLEY B. ARNOLD, citizen of the United States, residing at Chicago, in the county of Cook and State of Illinois, have invented a certain new and useful Improvement in Valves, of which the following is a full, clear, concise, and exact description.

My invention relates to valve structures and has for its object the provision of automatically operated means for effecting rotative step by step movement of the valve upon its seat to prevent warping and undesirable wearing of the valve and its seat. The invention is of particular service in connection with puppet valves.

In carrying out my invention I employ a spring supported at one end upon a seat carried by the valve stem, a member, preferably toothed, rotatable about the valve stem and a second member which is preferably toothed and stationary for limiting the aforesaid member to one direction of rotation. In the operation of the valve the spring which seats the valve also serves, in one operation of the spring, to turn the rotatable toothed member into new engagement with the fixed toothed member to enable the spring, in its reciprocal operation, to turn the valve to a new position.

Figure 1:
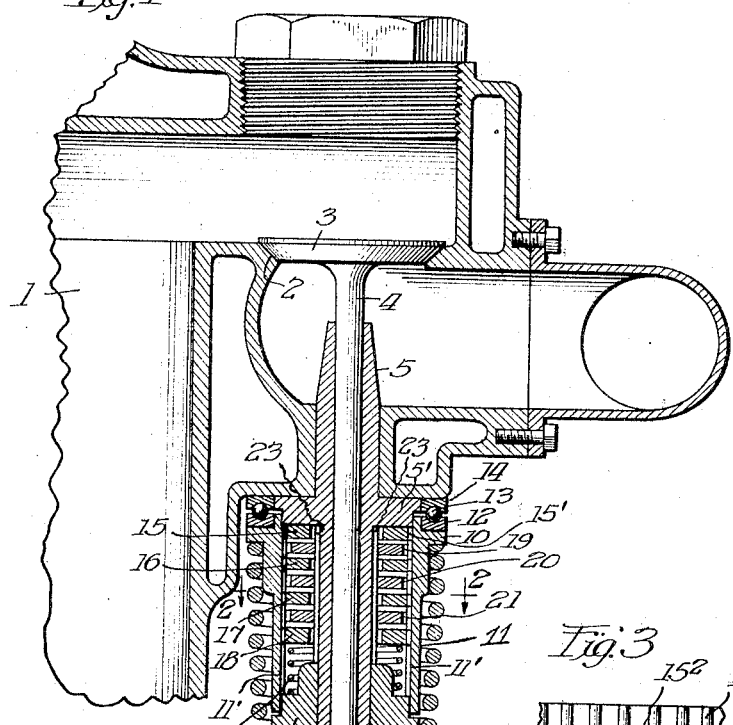
Figure 2:
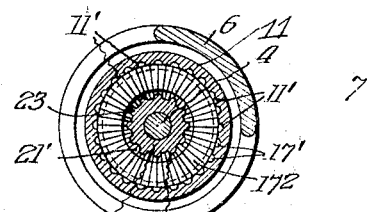
Figure 5:
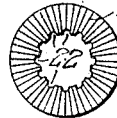
Figure 4:
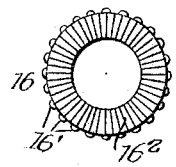
Figure 3:
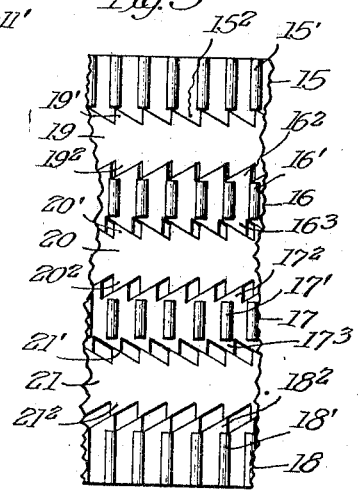

I will explain my invention more fully by reference to the accompanying drawing showing the preferred embodiment thereof as adapted to an internal combustion engine but to which adaptation the invention is not to be limited. In the drawing, Figure 1 is a view, mainly in section, illustrating a portion of an engine structure and a puppet valve pertaining thereto; Fig. 2 is a sectional view on line 2—2 of Fig. 1; Fig. 3 is a view in elevation illustrating the interengaging toothed members; Fig. 4 is a view of one of the facially toothed wheels which compose the rotatable toothed member; and Fig. 5 is a view of one of the facially toothed wheels which compose the fixed toothed member.

Like parts are indicated by similar characters of reference throughout the different figures.

The engine portion 1 illustrated is shown with a valve seat 2 which is adapted to receive a valve 3. This valve has a stem 4 that moves longitudinally of itself in the stem guide 5 which is held in fixed relation to the engine to be stationary. A coiled spring 6 surrounds the valve stem and presses downwardly thereon by reason of the engagement of the lower end of the spring with a spring seat 7 carried upon the stem, the spring thus serving to close the valve upon its seat. An engine operated cam 8, operating through a plunger 9, intermittently operates upon the stem to elevate it against the force of the spring intermittently to open or unseat the valve. The upper end of the spring engages the flange 10 upon the barrel 11. This barrel is coaxial with the valve stem and is rotatable about the same and for the purpose of its rotation the upper end of the barrel carries a pawl or roller raceway 12 which bears upwardly against the balls or rollers 13 of an anti-friction bearing which in turn rotate upon the raceway 14 carried by the engine structure. The spring not only exerts the valve closing function specified but, in each cycle of its operation, will cause a partial rotation of the barrel 11. The spring is enabled to effect such rotation of the barrel because of the slight twist which occurs between the ends of the spring each time the spring is compressed, the barrel then being free to turn. After the barrel has been turned it is held (by means to be set forth) from reverse rotation during the expansion of the spring and until the spring is again compressed to give the barrel a succeeding turning movement. Owing to the ball bearing structure intervening between the barrel and the engine minimum opposition is offered in the rotation of the barrel so that the barrel may turn while the spring is being compressed, the valve itself then not turning owing to the braking action due to the frictional engagement of its stem with the valve guide and the inertia of the parts of the valve.

A reverse twist occurs between the ends of the spring on the expansion thereof, and as the barrel is held from rotation during the expansion of the spring, the valve stem and the valve are turned owing to the driving connection of the lower end of the spring with the spring seat 7 that is normally in fixed relation with the valve stem. This movement of the valve occurs during the closing movement thereof and before it is seated. On each operation of the valve it is turned to a slight extent so that constantly new portions of the valve and its seat are engaged and the warping of the valve is prevented.

The means for preventing the rotation of the barrel during the expansion of the spring desirably resides in a toothed member rotating with the barrel and a second but stationary toothed member adapted for tooth engagement with the aforesaid toothed member. The toothed member that turns with the barrel comprises facially toothed wheels 15, 16, 17 and 18 which are slipped over the guide 5 and therefore surround the valve stem, these wheels being free to rotate about and with respect to said valve stem and guide. Said wheels have splined connection with the barrel, the splines $15^1$, $16^1$, $17^1$ and $18^1$ being provided upon said wheels and entering the spline grooves $11^1$ extending longitudinally of the barrel and located upon the interior thereof to communicate with the bore of the barrel. The stationary toothed member comprises facially toothed wheels 19, 20 and 21 which are slipped over the guide 5 and therefore also surround the valve stem. These wheels are maintained stationary by having splined connection with the stationary guide 5. To this end the stationary wheels are provided with spline grooves 22 which receive the splines 23 formed on the guide 5 and extending longitudinally thereof. All of the wheels, by reason of their splined connections, are adapted to move longitudinally of the valve guide and the barrel. The lower end of the valve guide carries a spring abutment 24 which is held upon the guide by a nut 25 which is threaded upon the lower end of the guide. A coiled spring 26 is seated upon the abutment 24 and presses against the toothed wheel 18 to maintain the wheels of both sets in as close assembly as possible, the uppermost wheel 15 being pressed against a flange $5^1$ that is formed upon the guide 5. The various wheels are facially toothed. The bottom face of the wheel 15 is formed with teeth $15^2$. The top and bottom faces of the wheel 16 are formed with teeth $16^2$, $16^3$. The top and bottom faces of the wheel 17 are formed with teeth $17^2$, $17^3$, and the top face of the wheel 18 is formed with teeth $18^2$. The top and bottom faces of the wheel 19 are formed with teeth $19^1$, $19^2$. The top and bottom faces of the wheel 20 are formed with teeth $20^1$, $20^2$, and the top and bottom faces of the wheel 21 are formed with teeth $21^1$, $21^2$. All of these teeth desirably radiate from the common axis of the wheels. The wheels are adapted to ride over each other owing to the longitudinal movability of the wheels which is permitted by the spring 26. The teeth are so directed and shaped that the rotatable teeth 15, 16, 17 and 18 may turn with the barrel 10 during the compression of the spring 6, reverse rotation of these particular toothed wheels being prevented by the full engagement of teeth upon one of these wheels with the teeth of the adjacent stationary wheel, the wheels of one set being alternated with the wheels of the other set.

The teeth of any plurality of wheels less than the whole number of each set are in varying degrees of proximity with the engageable teeth of a plurality of wheels of the other set when the adjacent teeth of any two remaining wheels of the two sets are in full engagement. Fig. 3 illustrates the teeth $15^2$ and $19^1$ of the two wheels 15 and 19 of the two sets in full engagement. The teeth $16^2$, $19^2$ of the wheels 16, 19 are nearly in full engagement. The teeth $16^3$, $20^1$ are farther apart than the last mentioned teeth. The teeth $17^2$, $20^2$ are still farther apart. The teeth $17^3$, $21^1$ are yet farther apart and the teeth $18^2$, $21^1$ are farthest apart, being on the point of entering into full engagement with each other on the next turning engagement of the barrel. By this arrangement there are always two sets of teeth belonging to wheels of different sets which are capable of being brought into full engagement to limit the barrel to one direction of rotation which happens whenever a slight twisting movement occurs between the ends of the spring 6 on the compression of such spring. After such rotation of the barrel it is held by engaging teeth to afford means against which the upper end of the spring may react on the expansion of the spring to enable the lower end of the spring, as it twists with respect to the upper end of the spring, to turn the valve on the descending movement thereof. By the construction specified a slight turning movement is imparted to the valve in each of its cycles of operation with the advantages that have been specified.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A valve structure including a valve seat; a valve; a stem for the valve; a guide for the valve stem; a coiled spring surrounding the valve stem; a seat carried by the valve stem for one end of said coiled spring; a rotatable barrel surrounding the valve stem and engaged by the other end of the spring; a toothed member within and turning with the barrel; and a second but stationary toothed member in tooth engagement with the aforesaid member and also within the barrel, the spring turning the barrel and thereby bringing the toothed member moving therewith into new engagement with the fixed toothed member.

2. A valve structure including a valve seat; a valve; a stem for the valve; a guide for the valve stem; a coiled spring surrounding the valve stem; a seat carried by the valve stem for one end of said coiled spring; a toothed member rotatable about the valve stem; and a second but stationary toothed member in tooth engagement with the aforesaid toothed member, the spring turning the rotatable toothed member into new engagement with the fixed toothed member.

3. A valve structure including a valve seat; a valve; a stem for the valve; a guide for the valve stem; a coiled spring surrounding the valve stem; a seat carried by the valve stem for one end of said coiled spring; a rotatable barrel surrounding the valve stem and engaged by the other end of the spring; a toothed member within and turning with the barrel; and a second but stationary toothed member in tooth engagement with the aforesaid member and also within the barrel, the spring turning the barrel and thereby bringing the toothed member moving therewith into new engagement with the fixed toothed member, each of the two members comprising toothed wheels alternated with the wheels of the other member, the teeth of any plurality of wheels less than the whole number of each member being in varying degrees of proximity with the engageable teeth of a plurality of wheels of the other member when the adjacent teeth of any two remaining wheels of the two members are in full engagement.

4. A valve structure including a valve seat; a valve; a stem for the valve; a guide for the valve stem; a coiled spring surrounding the valve stem; a seat carried by the valve stem for one end of said coiled spring; a toothed member rotatable about the valve stem; and a second but stationary toothed member in tooth engagement with the aforesaid toothed member, the spring turning the rotatable toothed member into new engagement with the fixed toothed member, each of the two members comprising toothed wheels alternated with the wheels of the other member, the teeth of any plurality of wheels less than the whole number of each member being in varying degrees of proximity with the engageable teeth of a plurality of wheels of the other member when the adjacent teeth of any two remaining wheels of the two members are in full engagement.

5. A valve structure including a valve seat; a valve; a stem for the valve; a guide for the valve stem; a coiled spring surrounding the valve stem; a seat carried by the valve stem for one end of said coiled spring; a rotatable barrel surrounding the valve stem and engaged by the other end of the spring; a toothed member within and turning with the barrel; and a second but stationary toothed member in tooth engagement with the aforesaid member and also within the barrel, the spring turning the barrel and thereby bringing the toothed member moving therewith into new engagement with the fixed toothed member, each of the two members comprising toothed wheels alternated with the wheels of the other member, the teeth of any plurality of wheels less than the whole number of each member being in varying degrees of proximity with the engageable teeth of a plurality of wheels of the other member when the adjacent teeth of any two remaining wheels of the two members are in full engagement, the wheels forming one member being contained within the barrel and in splined connection therewith while the wheels of the other member surround the guide for the valve stem and are in splined connection therewith.

6. A valve structure including a valve seat; a valve; a stem for the valve; a guide for the valve stem; a spring; a seat carried by the valve stem for one end of said spring; a toothed member rotatable about the valve stem; and a second but stationary toothed member in tooth engagement with the aforesaid toothed member, the spring turning the rotatable toothed member into new engagement with the fixed toothed member.

7. A valve structure including a valve seat; a valve; a stem for the valve; a guide for the valve stem; a coiled spring surrounding the valve stem; a seat carried by the valve stem for one end of said coiled spring; a toothed member rotatable about the valve stem; and a second but stationary toothed member in tooth engagement with the aforesaid toothed member, the spring turning the rotatable toothed member into new engagement with the fixed toothed member, each of said toothed members having a number of teeth, a plurality of teeth of each member being in varying degrees of proximity with engageable teeth of the other member when other teeth of the two members are in full engagement.

8. A valve structure including a valve seat; a valve; a stem for the valve; a guide for the valve stem; a spring; a seat carried by the valve stem for one end of said spring; a toothed member rotatable about the valve stem; and a second but stationary toothed member in tooth engagement with the aforesaid toothed member, the spring turning the rotatable toothed member into new engagement with the fixed toothed member, each of said toothed members having a number of teeth, a plurality of teeth of each member being in varying degrees of proximity with engageable teeth of the other member when other teeth of the two members are in full engagement.

9. A valve structure including a valve seat; a valve; a stem for the valve; a coiled spring; a seat carried by the valve stem for one end of said spring; a member turned by the spring upon relative twisting movement between the ends of the spring; and means for limiting this member to rotation in one direction whereby the spring is adapted to turn the valve upon succeeding relative twisting movement between the ends of the spring.

In witness whereof, I hereunto subscribe my name this tenth day of July, A. D., 1918.

STANLEY B. ARNOLD.